US009378188B2

(12) United States Patent
Oygard

(10) Patent No.: US 9,378,188 B2
(45) Date of Patent: Jun. 28, 2016

(54) METHOD AND DEVICE FOR DYNAMICALLY WRAPPING TEXT WHEN DISPLAYING A SELECTED REGION OF AN ELECTRONIC DOCUMENT

(75) Inventor: Karl Anders Oygard, Oslo (NO)

(73) Assignee: OPERA SOFTWARE ASA, Oslo (NO)

( * ) Notice: Subject to any disclaimer, the term of this patent is extended or adjusted under 35 U.S.C. 154(b) by 403 days.

(21) Appl. No.: 12/423,968

(22) Filed: Apr. 15, 2009

(65) Prior Publication Data

US 2009/0319888 A1   Dec. 24, 2009

Related U.S. Application Data

(60) Provisional application No. 61/045,195, filed on Apr. 15, 2008.

(51) Int. Cl.
| | | |
|---|---|---|
| *G06F 17/00* | (2006.01) | |
| *G06F 17/21* | (2006.01) | |
| *G06F 17/25* | (2006.01) | |
| *G06F 17/30* | (2006.01) | |

(52) U.S. Cl.
CPC .............. *G06F 17/211* (2013.01); *G06F 17/25* (2013.01); *G06F 17/30905* (2013.01)

(58) Field of Classification Search
CPC ................ G06F 17/30905; G06F 2203/04806; G06F 17/211; G06F 17/212; G06F 3/0485; G06F 17/25
USPC .................................................. 715/238, 815
See application file for complete search history.

(56) References Cited

U.S. PATENT DOCUMENTS

| | | | |
|---|---|---|---|
| 7,191,407 B1 * | 3/2007 | Kluttz et al. .................. 715/788 |
| 2003/0014445 A1 | 1/2003 | Formanek et al. | |
| 2005/0071774 A1 * | 3/2005 | Lipsky et al. ................. 715/788 |
| 2005/0131887 A1 * | 6/2005 | Rohrabaugh et al. ............. 707/3 |
| 2005/0195221 A1 | 9/2005 | Berger et al. | |

(Continued)

FOREIGN PATENT DOCUMENTS

| | | |
|---|---|---|
| JP | 7-261724 A | 10/1995 |
| JP | 07261736 A | 10/1995 |

(Continued)

OTHER PUBLICATIONS

Developing Screen Orientation Aware Applications, Microsoft, Mar. 2004; http://msdn.microsoft.com/en-us/library/ms839354.aspx.*

(Continued)

*Primary Examiner* — Scott Baderman
*Assistant Examiner* — Howard Cortes
(74) *Attorney, Agent, or Firm* — Birch, Stewart, Kolasch & Birch, LLP

(57) ABSTRACT

A method is provided for rewrapping text when changing from a first to a second zoom level when displaying an electronic document. The line length at which to rewrap the text is chosen such that no horizontal scrolling becomes necessary. Since the rewrapping may result in a change to the layout of the document, the method may further include identifying an element in the electronic document and ensuring that the element is included in the display after a zooming-in or zooming-out operation. Also described is a device configured to perform the method and a computer program including instructions for performing the method when executed by a computing device.

18 Claims, 6 Drawing Sheets

(56) References Cited

U.S. PATENT DOCUMENTS

| | | | |
|---|---|---|---|
| 2006/0195784 A1* | 8/2006 | Koivisto et al. | 715/523 |
| 2006/0227153 A1* | 10/2006 | Anwar et al. | 345/660 |
| 2008/0077880 A1 | 3/2008 | Oygard | |
| 2008/0092040 A1 | 4/2008 | Nakamura | |
| 2008/0148177 A1* | 6/2008 | Lang et al. | 715/784 |
| 2008/0215966 A1* | 9/2008 | Suarez | 715/252 |
| 2010/0005387 A1 | 1/2010 | Toki | |

FOREIGN PATENT DOCUMENTS

| | | |
|---|---|---|
| JP | 2000-115527 | 4/2000 |
| JP | 2000-311039 A | 11/2000 |
| JP | 2008-70831 A | 3/2008 |
| KR | 10-2007-0099670 | 10/2007 |
| WO | WO-02/13176 A2 | 2/2002 |
| WO | WO-2005/038673 A1 | 4/2005 |
| WO | WO 2008/035986 A1 | 3/2008 |
| WO | WO 2008/041743 A1 | 4/2008 |

OTHER PUBLICATIONS

Microsoft Corporation, 'Step by Step: Developing Orientation-Aware and Resolution-Aware Windows Mobile-based Applications in Native Code,' Internet catalog Dec. 31, 2005.

XP055097173 Anonymous:"PalmAddicts: Opera Mini 4 Beta "Dimension" Released", Nov. 9, 2007; Retrieved online Jan. 20, 2014: http://web.archive.org/web/20071109101036/http://palmaddict.typepad.com/palmaddicts/2007/06/opera_mini_4_be.html.

* cited by examiner

METHOD AND DEVICE FOR DYNAMICALLY WRAPPING TEXT WHEN DISPLAYING A SELECTED REGION OF AN ELECTRONIC DOCUMENT

This Nonprovisional application claims priority under 35 U.S.C. §119(e) on U.S. Provisional Application No. 61/045,195 filed on Apr. 15, 2008, the entire contents of which are hereby incorporated by reference into the present application.

TECHNICAL FIELD

The present invention relates to the display of electronic documents on the display of a device. In particular, the invention relates to a method for selecting a particular region within such a document and dynamically wrapping, or reflowing, text in the selected region. The invention also relates to a device configured to operate in accordance with the method, and a computer program comprising instructions which, when executed by one or more processing units in the device, perform the method.

BACKGROUND ART

Electronic documents such as web pages are often designed to be displayed on regular desktop computers with standard size displays. When such documents are displayed on other devices, e.g., handheld devices, mobile phones, television sets or gaming consoles, the size and layout of the display may not render the document in a manner that is convenient to the user. Various methods have been suggested in order to handle this. Such methods usually make modifications to the document before it is displayed in order to make the document fit the screen. This typically involves removing content or layout that does not suit the size or inherent properties of the screen. A common problem with such solutions is that the page may be rendered unusable or unrecognizable by the user, or the user may have difficulties navigating within the document.

Other approaches involve resizing or moving parts of the document, such as reducing image sizes, reducing the number of columns by changing the layout of the document, and changing colors, contrasts, brightness and font sizes.

An approach that has gained popularity lately is to initially display the document substantially as originally designed by the author, and provide methods for zooming in or out in order to display particular regions or elements on a page. Such methods are often intuitive and user friendly, but they are not without drawbacks, particularly when handling text. For instance, if a text block is very wide it may become necessary to scroll horizontally in order to read the text. In order to avoid this, it has been proposed to rewrap all text in narrow columns that will fit inside the screen of a device after zooming in. This, of course, changes the original lay out created by the page author, and may result in a document that is substantially longer in the vertical direction.

Consequently there is a need for methods that can overcome these drawbacks and result in a smoother and more user friendly way of displaying documents on small screen devices.

SUMMARY OF THE INVENTION

According to the present invention, a method is provided for dynamically wrapping text when displaying a selected region of an electronic document in a manner that is adapted to the capabilities of a display.

The method may include such steps as loading a document, determining a layout of the document such that the text in the document is wrapped in accordance with the determined layout, displaying at least a part of the document on a display screen at a first resolution and in accordance with the determined layout, receiving user input representing a command to display the document at a second resolution, rewrapping at least some text in the document based on a maximum line length associated with the second resolution, determining a layout of the document after the relevant text has been rewrapped, and displaying at least a part of the document on the display screen with the rewrapped text at the second resolution.

The maximum line length may be defined by the width of the display screen of the device, from information stored in a configuration file, or based on the width of a window within which the document is displayed. According to some embodiments, the maximum line length may be defined as a ratio of hardware display pixels to original document pixels along one dimension, and the maximum line length in terms of original document resolution is determined as the width of a display window (in terms of hardware pixels) divided by the ratio.

According to some embodiments consistent with the invention, user input representing a command to display the document at a second resolution includes information that can be used to identify an element in the document, and the step of displaying the document at the second resolution includes the step of positioning the identified element at a predefined position in the display. This can be used when increasing the resolution ratio (zooming in) and decreasing the ratio (zooming out) in order to ensure that a user views the same part of the document content even if the layout is substantially changed by the rewrapping of the text.

According to the invention, a computing device may be configured to display electronic documents for selecting and displaying a region of interest in an electronic document on the display of a device, including a display, a user input interface, a communication interface capable of receiving electronic documents, memory device into which a received document can be loaded, and a module configured to perform such steps as: loading a document, determining a layout of the document, displaying at least a part of the document on a display screen at a first resolution and in accordance with the determined layout such that the text in the document is wrapped in accordance with the determined layout, receiving user input representing a command to display the document at a second resolution, rewrapping at least some text in the document based on a maximum line length associated with the second resolution, determining a layout of the document after the relevant text has been rewrapped, and displaying at least a part of the document on the display screen with the rewrapped text at the second resolution.

The device may further be configured to perform additional steps of the method of the invention.

Finally, according to the invention, a computer program stored on a computer readable storage medium may include instructions that, when loaded and executed on a computing device, are capable of performing a method of dynamically wrapping text in accordance with principles of the invention.

DETAILED DESCRIPTION OF EXEMPLARY EMBODIMENTS OF THE INVENTION

The present invention will now be described in further detail with reference to the accompanying Figures. The present invention may be embodied in many different forms and should not be construed as limited to the embodiments set forth herein. Rather these embodiments are provided as examples in order to provide those skilled in the art with a complete understanding of the invention.

In particular it should be understood that while the examples refer to particular standards and formats for creating, formatting, transmitting and displaying content on the Internet and the World Wide Web, the invention should not be construed as limited to the particular standards mentioned herein.

Figure 1:
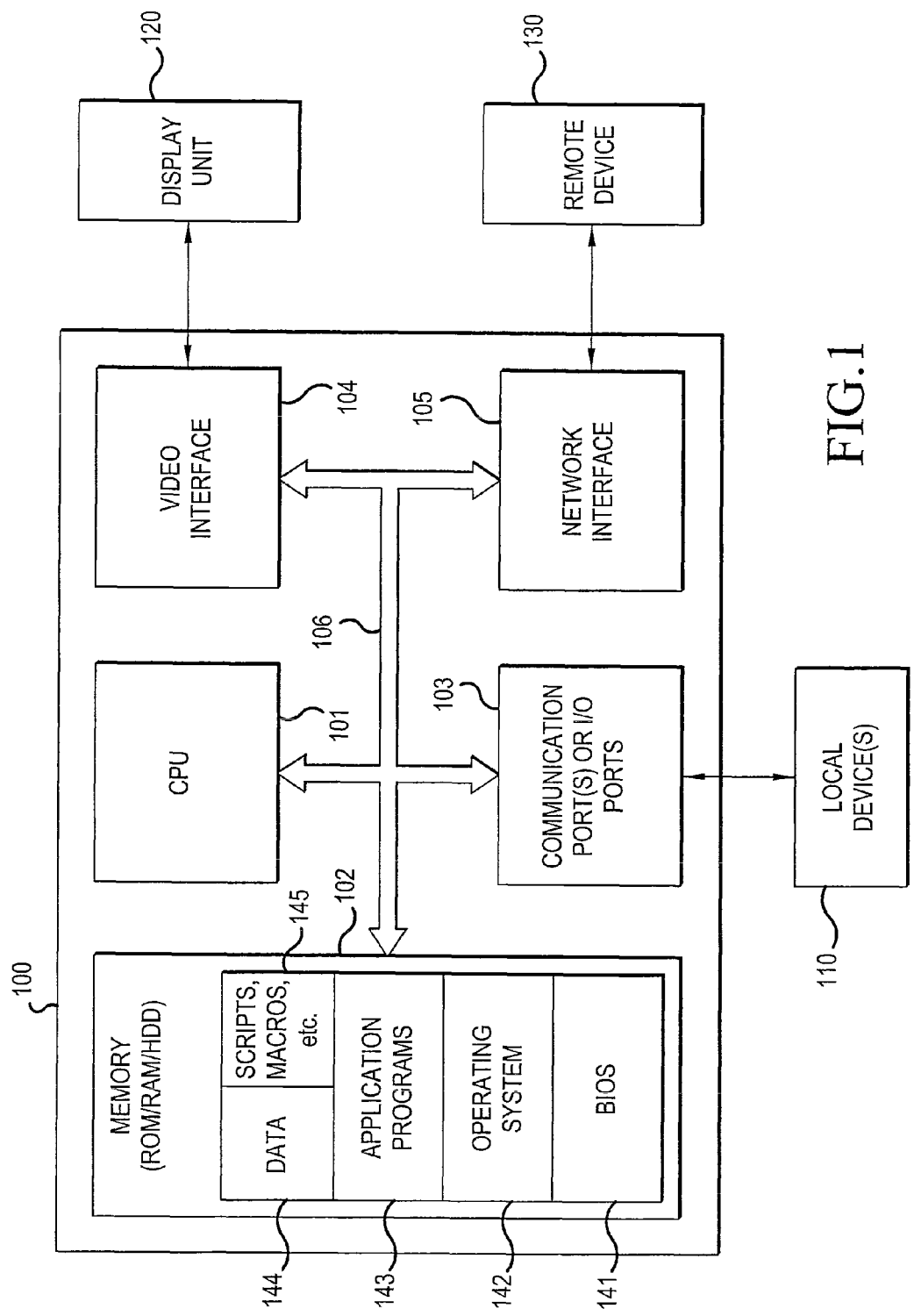
FIG. 1 shows a diagram of a computing device that can be used for implementing various aspects of the invention.

FIG. 1 illustrates a generalized computing device 100 that can be used as an environment for implementing various aspects of the present invention. In FIG. 1, a device 100 includes a central processing unit (CPU) 101, memory 102, communication port(s) or input/output ports (I/O ports) 103, a video interface 104, and a network interface 105. These units are in communication with each other by way of a system bus 106.

The memory, which may include ROM, RAM, flash memory, hard drives, or any other combination of fixed and removable memory, stores the various software components of the system, such as a basic input/output system (BIOS) 141, an operating system 142, various computer programs 143 including applications and device drivers, various types of data 144, and other executable files or instructions such as macros and scripts 145.

The I/O ports 103 may be connected to one or more local devices 110 such as user input devices (e.g., keyboard, mouse, or a remote control), a printer, media players, external memory devices, and special purpose devices such as, e.g., a global positioning system receiver (GPS) or a television set top box. The I/O ports 103 may be any combination of ports such as USB, PS/2, RS-232, infra red (IR), Bluetooth, printer ports, or any other standardized or dedicated communication interface for local devices 110.

The video interface device 104 is connected to a display unit 120 which may be an external monitor or an integrated display such as an LCD display. The display unit 120 may have a touch sensitive screen and, in that case, the display unit 120 may double as a user input device. The user input device aspects of such a display unit 120 may be considered as one of the local devices 110 communicating over a communication port 103.

The network interface device 105 provides the device 100 with the ability to connect to a network in order to communicate with a remote device 130. The communication network, which in FIG. 1 is only illustrated as the line connecting the network interface 105 with the remote device 130, may, e.g., be a local area network or the Internet. The remote device 130 may in principle be any computing device with similar communications capabilities as the device 100, but may typically be a server or some other unit providing a networked service. It will be understood by those of ordinary skill in the art that the communication network may be any publicly accessible network, or combination of networks, including the Internet, cellular mobile networks such as GSM, the public telephone network, cable networks, or analog or digital broadcasting or satellite.

It will be understood that the device 100 illustrated in FIG. 1 is not limited to any particular configuration or embodiment regarding size or resources. The various components illustrated may be implemented as one or more integrated units of the device 100 or distributed over several units. Other units or capabilities may of course also be present. Furthermore, the device 100 may, e.g., be a general purpose computer such as a PC, a personal digital assistant (PDA), a cell phone or a smart phone, or a gaming console or television set top box or media center.

Figure 2:
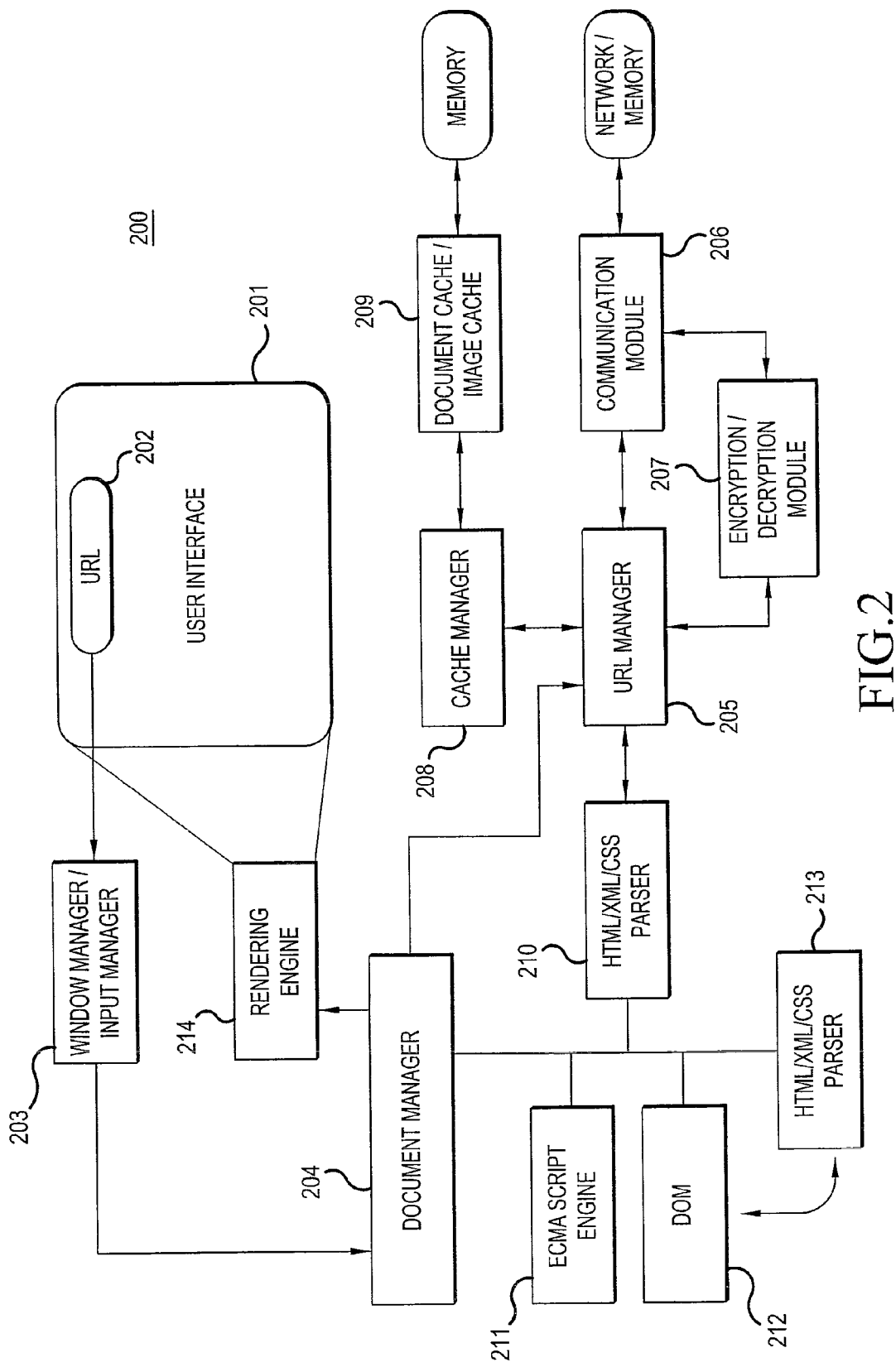
FIG. 2 shows the various modules of a user agent application that may used in conjunction with the invention.

Various aspects of the present invention may be implemented as components and/or functionality of a user agent or a browser, which may be installed as an application on a device 100. FIG. 2 shows an example of a number of modules that may be present in such a user agent. The modules will typically be software modules, or otherwise implemented in software, which may be executed by the CPU 101.

The user agent 200 in FIG. 2 presents the user with a user interface 201 that may be displayed on the display unit 120 shown in FIG. 1. The user interface 201 may include an address field 202 where the user may use an input device to enter the URI of a document or a service he or she wants the user agent 200 to retrieve. The address field 202 may also be a displayed link that may be activated by the user using a pointing device such as a mouse, a scrolling device or some other means for selecting displayed items. Alternatively, the URI may be specified in the code of a document or script already loaded by the user agent 200.

In any case, the URI may be received by a window and input manager 203 that represents the input part of a user interface 201 associated with or part of the user agent 200. The URI may then be forwarded to a document manager 204 which manages the data received as part of the document identified by the URI.

The document manager 204 forwards the URI to a URI manager 205 which again instructs a communication module 206 to request access to the identified resource. The communication module 206 may be capable of accessing and retrieving data from a remote device 130 such as a server over a network using the hypertext transfer protocol (HTTP) or some other protocol such as HTTPS (HTTP over Secure Socket Layer) or FTP (File Transfer Protocol). The communication module 206 may also be capable of accessing data that is stored in local memory 102.

If communication outside the device 100 is required to be encrypted, e.g., as specified by the protocol used to access the URI, encryption/decryption module 207 handles communication between the URI manager 205 and the communication module 206.

The data received by the communication module 206 in response to a request is forwarded to the URI manager 205. The URI manager 205 may then store a copy of the received content in local memory 102 using a cache manager 208 which administers a document and image cache 209. If the same URI is requested at a later time the URI manager 205 may request it from the cache manager 208 which, unless the cached copy has been deleted, will retrieve the data from the cache 209 and forward it to the URI manager 205. In this case it will not be necessary to retrieve the data again from a remote device 130 when the same URI is requested a second time.

The URI manager 205 forwards the received data to a parser 210 that may be capable of parsing such content as HTML, XML and CSS. The content may then, depending on the type and nature of the content, be processed further by an ECMAScript engine 211, a module for handling a document object model (DOM) structure 212 and/or a layout engine 213.

This processing of the retrieved content is administered by the document manager 204, which may also forward additional URI requests to the URI manager 205 as a result of the processing of the received content. These additional URIs may, e.g., specify images or other additional files that should be embedded in the document specified by the original URI.

When the data representing the content of the specified document has been processed, it is forwarded from the document manager 204 in order to be rendered by a rendering engine 214 and displayed on the user interface 201.

The various modules thus described may be executed by the central processing unit 101 of the device 100 of FIG. 1 as the processor receives instructions and data over the system bus(es) 106. The communication module 206 may communicate with the remote device 130 using the network interface 105 of device 100. The functionality of the various modules may of course be integrated in fewer larger modules, or distributed or replicated over several modules.

It will further be understood that the user agent 200 described above may be implemented as an application program 143, but that some functionality may also be part of the operating system 142 or even the BIOS 141 of the device 100. The content received in response to a URI request may be data 144, script 145 or a combination of these as further described below.

It should be noted that FIGS. 1 and 2 are not intended to be limiting. The device 100 and user agent 200 illustrated therein may be modified by omitting certain modules or functionalities and/or adding other modules or functionalities as will be contemplated by persons of ordinary skill in the art.

Electronic documents, such as web pages, are typically created using a markup language such as HTML, XHTML or XML, and they are usually given a layout that is designed for standard computer displays. However, user agents such as browsers are increasingly being installed on other types of devices, such as PDA's, cell phones, television set top boxes and gaming consoles. Such devices have a wide variety of displays with different sizes, shapes and resolution. These devices may not be able to render and display web pages in a meaningful way. A document may be reduced in size to the point of becoming unreadable, only a small part of the document may be displayed at a time, or the layout of the document may be changed in ways that were never intended by the creator of the document.

Figure 3A:
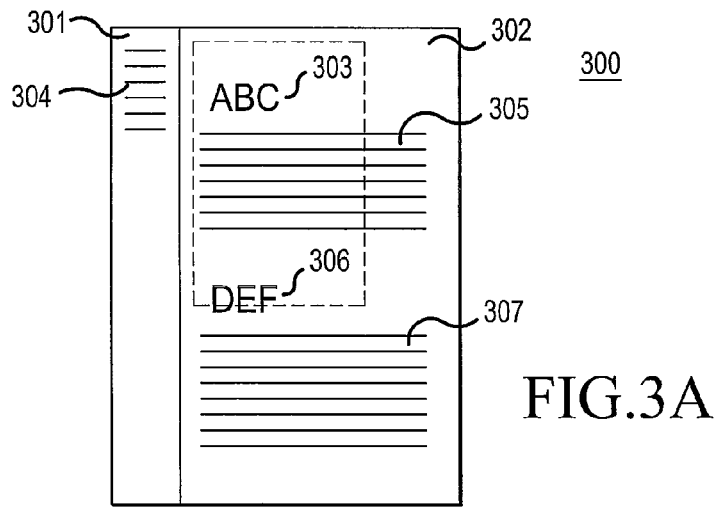
FIGS. 3A-3C show the layout of an electronic document and its display in a browser window.
Figure 3B:
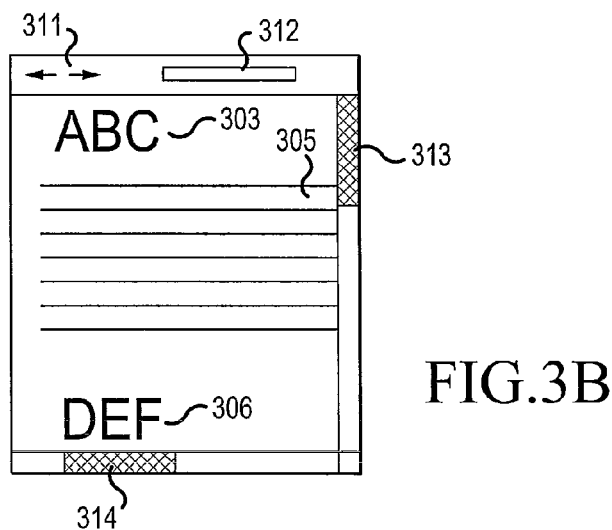
Figure 3C:
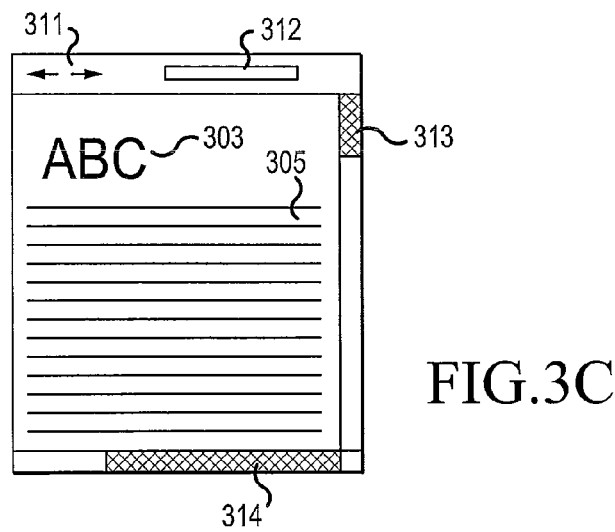

Reference is now made to FIGS. 3A-3C. FIG. 3A shows the entire layout of an exemplary web page (document) 300. The web page 300 includes a left margin 301 and a main content area 302. The main content area 302 includes an article starting with a headline 303 followed by text 305, and a second headline 306 followed by additional text 307. The left margin 301 includes a navigation menu 304 with a number of menu entries that may be hyperlinks to other parts of the same web site. As shown in FIG. 3A, a wrapping of the text 305 may already be implemented in accordance with the original layout of the web page 300.

FIG. 3B shows a part of the web page 300 of FIG. 3A displayed in a browser window or user agent window. The user agent 200 which is described above with reference to FIG. 2 may be used for displaying the web page 300, and the window may be displayed on the display 120 of a device 100 described above with reference to FIG. 1. The size of the viewport relative to the entire document 300 may be determined simply by the properties of the device and/or the user agent 200 used to display the document, or it may be the result of a zoom operation invoked by the user to enlarge the document, e.g., in order to display the text 305 with characters large enough for comfortable reading.

The window includes navigation buttons 311, an address field 312 where the URL of a desired document 300 may be entered, and a vertical scroll bar 313. The remaining part of the browser window is used to display a part of the document 300. This remaining part of the window is referred to as the viewport. The viewport of FIG. 3B is indicated in FIG. 3A as dotted lines. It will be noticed that in the example illustrated in FIG. 3B, the viewport is not wide enough to display the entire width of the web page 300. Also, only the upper part of the document 300 can be shown, such that the second article 306 disappears below the viewport.

In order to view the parts of the document 300 that disappear below the viewport, a vertical scroll bar 313 has been provided. This scroll bar 313 makes it possible to move the viewport down relative to the document 300. This is normally not very inconvenient to users, since text is read from top to bottom of a document, and scrolling will only be necessary in one direction, namely downwards. In the case where text is presented in several columns, it may be necessary to scroll back up to the top of the page. But even this does not have to be experienced as an unacceptable inconvenience, since a single page will rarely include more than two or three columns, and scrolling back to the top of the document will only be necessary once or at most a few times, and only after having completed reading of an entire column.

It will further be noticed in FIG. 3B that since the viewport is not wide enough to display the entire width of the document 300, a horizontal scroll bar 314 has been provided. In order to read the text 305, it will be necessary to use this scroll bar 314 repeatedly in both directions. As opposed to the vertical scroll bar 313, which is mainly used in the downward direction, and only infrequently in the upward direction, the horizontal scroll bar 314 must be used in both directions for each line of text that extends beyond the right edge of the viewport. This represents an unacceptable inconvenience to the user.

FIG. 3C again shows a part of the web page 300 displayed on a display 120. The viewport of the display 120 may be the same as that illustrated in FIG. 3B, but in this case, the text 305 has been rewrapped (with respect to the original text wrapping imposed by the layout of FIG. 3A) such that each line of the text 305 fits inside the viewport. The user agent window may include the same features as the browser window illustrated in FIG. 3B, such as navigation buttons 311 and a vertical scroll bar 313, but the rewrapping of the text 305 has resulted in a narrower document 300 and the need for a horizontal scroll bar 314 may have been removed. In this example the horizontal scroll bar 314 makes it possible to scroll left in order to see the navigation menu 304, but the length and position of the scroll bar 314 indicates that no content exists to the right of the current viewport, and no horizontal scrolling is necessary in order to read the text 305. The vertical scroll bar 313 indicates that the document 300 has become much longer, since the scroll bar 313 is now a lot shorter relative to the height of the viewport.

It will be understood that rewrapping does not have to mean that the entire document 300 is brought inside the viewport. The purpose of rewrapping may primarily be to bring one text block, or one column of text, inside the viewport. Additional elements, such as images, a navigation menu 304, or additional columns of text 305, may still be located outside the viewport and necessitate horizontal scrolling. However, horizontal scrolling may no longer be necessary while reading a particular column of text.

It will also be understood that rewrapping of text 305 may be imposed on a document 300 in accordance with different rules or methods, and that the result shown in FIG. 3C may be the end result of different methods. This will be discussed briefly with reference to the example shown in FIGS. 4A-4B, which is similar to the example of FIGS. 3A and 3C, but with a couple of images added.

Figure 4A:
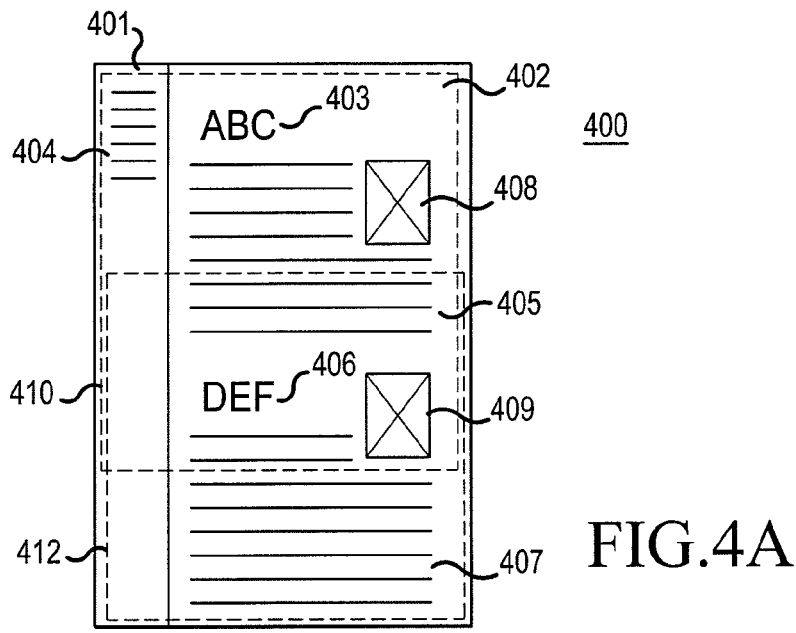
FIGS. 4A and 4B show how the layout of an electronic document may be a result of a number of layout boxes.
Figure 4B:
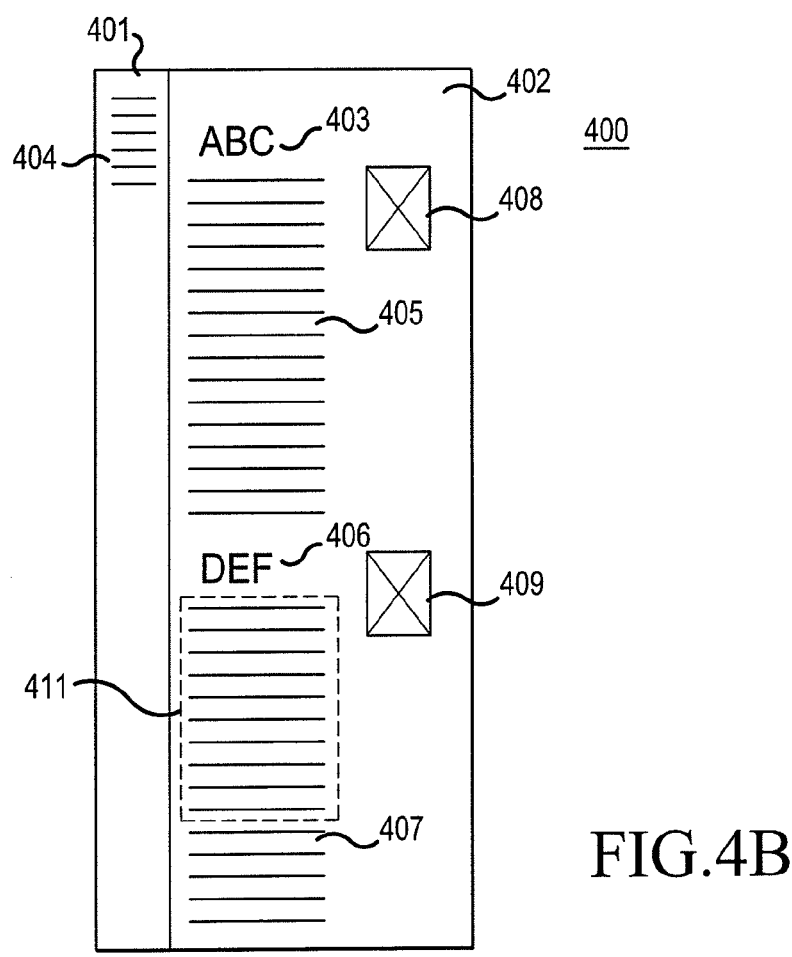

A first alternative is to rewrap all text when the document is loaded, as illustrated in FIGS. 4A and 4B. According to this strategy, the layout of the entire document is changed. FIG. 4A illustrates the layout of a document 400 which includes a left margin 401 with a navigation menu 404 and a main content area 402 with a first headline 403, a first text 405, a second headline 406 and a second text 407. Also included are first and second images 408, 409.

FIG. 4B illustrates how the same document 400 may appear after rewrapping of the text 405, 407. It will be noticed that while the text columns are narrower and longer, the rest of the layout is preserved. This increases the amount of whitespace and makes the entire document 400 considerably longer. Displayed in a normal mode, the document 400 may look disorganized, and elements that are intended to be close together (e.g., an article and an illustration) may appear disconnected. Displayed in a zoomed-in manner, the text 405, 407 may be readable in a convenient manner, similar to that illustrated in FIG. 3C, but it may be necessary to do a lot of horizontal scrolling in order to view illustrations accompanying a text.

This inconvenience may be overcome by making all blocks narrower in order to maintain the relationship between various elements. However, with more complex page layouts, such an approach may be undesirable or even impossible, or it may have to involve additional measures (e.g., resizing of images) that result in a radical change in the original layout as conceived by the author of the page.

According to principles consistent with the present invention, a document that is loaded by a user agent 200 is parsed, and its layout is determined in a manner that is consistent with the original intent of the author of that document.

The example illustrated in FIG. 4A is based on Cascading Styles Sheets (CSS), level 2 revision 1, as specified in Technical Report No. TR/2007/CR-CSS21-20070719, "Cascading Style Sheets Level 2 Revision 1 (CSS 2.1) Specification," published by the World Wide Web Consortium (W3C) on Jul. 19, 2007, edited by Bert Bos, Tantek celik, Ian Hickson, and Håkon Wium Lie, which is hereby incorporated by reference. The invention is, however, not limited to this version of CSS, or indeed CSS in particular.

When a markup language document is received by a user agent 200 such as the one illustrated in FIG. 2, the document is typically handled as described above. The layout engine 213 may, based on the DOM structure of the document, generate a number of boxes based on elements in the DOM tree.

The term "elements" is recognized by persons of ordinary skill in the art refer to a syntactic constructs in a markup language document indicating structure. Such an element may define a structural unit containing content (e.g., text or image). The term "box" is recognized within the art to refer to a rectangular space within the layout of the document, to be occupied by the content of a particular element.

According to the general approach of the CSS 2.1 box model, boxes defined as block boxes establish containing blocks for descendant boxes. (Certain other types of blocks, such as inline boxes are not block boxes.) In addition, certain other types of elements that are not defined as boxes, such as various table elements, also establish containing blocks.

The dimensions and position of an element on a page is determined by a calculation of the edges of the block box containing the element. In FIG. 4A, the top level box is the containing block for the entire page. Typically, the left margin 401 may be contained in one descendant of the containing block for the entire page, while the main content is contained in another descendant box. The position of the menu 404 may then be calculated based on the edges of its containing block. The headline 403, image 408 and text 405 may be contained in a box which has the box for the main content as its containing block. The headline 403, image 408 and text 405 will also have their own respective containing blocks which will be descendants of the block containing all three elements. A similar structure may be used for elements 406, 407 and 409.

It will be understood by those with skill in the art that other structures of containing blocks are possible for the layout illustrated in the drawing.

The position of the headline 403 may be calculated by the layout engine 213 based on the edges of its containing block. The same is the case for the text 405, where the lines will be wrapped at the right edge of the box of its containing block and the edges of the image boxes—unless the author has included instructions that override this default text wrapping.

As already described, it may be desirable to wrap the text to shorter lines such that it becomes possible, e.g., on devices 100 with small screens, to zoom in and read the text without having to scroll horizontally. FIG. 4B illustrates what the layout of the same page 400 may look like after text has been wrapped to shorter lines. After a zoom-in operation, this layout may be preferable because the lines may be wrapped such that they fit the viewport of a browser window after the zoom-in operation has been performed. However, it will be clear from the drawing that prior to the zoom-in operation, the layout illustrated in FIG. 4B may be inconvenient to a user, e.g., because it provides too much whitespace and makes the document 400 unnecessarily long.

Consistent with principles of the present invention, a user agent 200 may be configured to dynamically rewrap the text in response to a zoom-in operation. The document 400 may then be displayed consistent with the layout originally intended by its author before a zoom-in operation, as exemplified by FIG. 4A, while the text is dynamically re-wrapped as part of a zoom-in operation, as exemplified by FIG. 4B.

Figure 5:
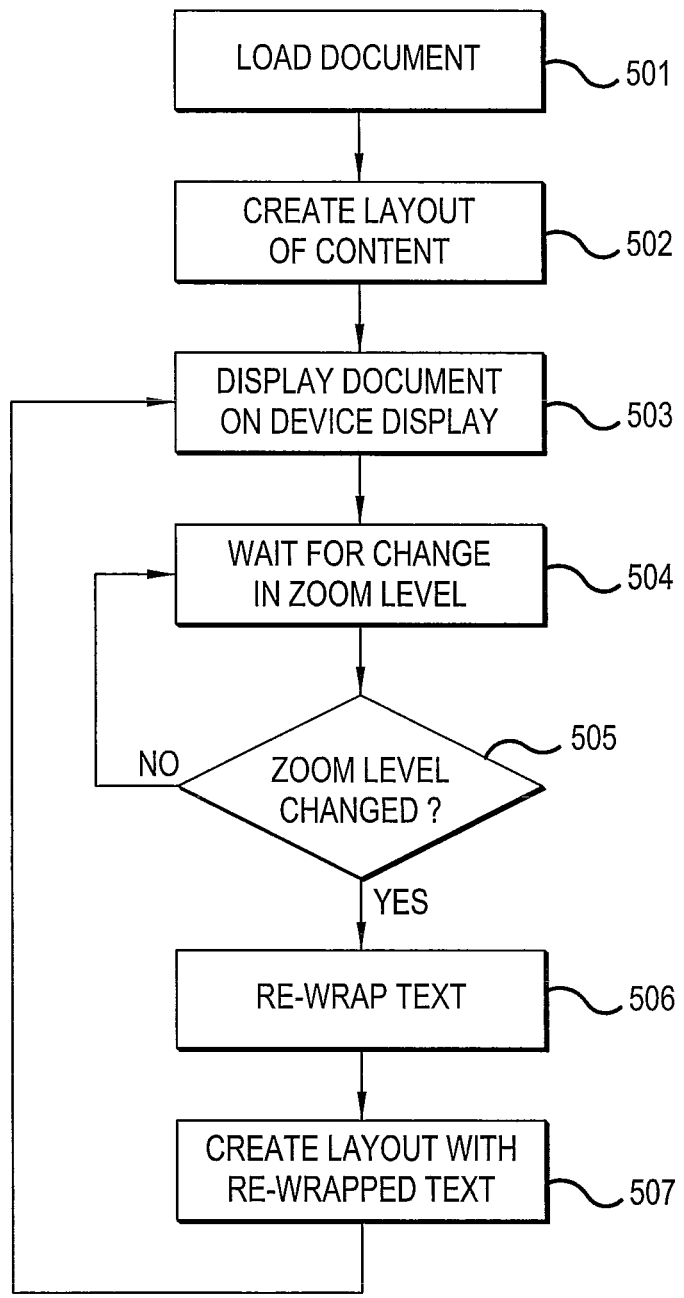
FIG. 5 shows how a region of interest may be identified and displayed based on the present invention.

FIG. 5 is a flow chart showing the steps of a method according to an exemplary embodiment of the invention.

In a first step 501, a document 300, 400 is loaded by the user agent 200. In a next step 502, the document 300, 400 is then parsed and the layout is created, consistent with the design created by the document's author and specifications from standards such as HTML and CSS. This layout may exist on a memory 102 on the device 100 on which the user agent 200 is installed. This memory 102 may be thought of as providing a virtual display. The resolution of this virtual display will be consistent with the dimensions of the original document, in terms of pixels.

The document 300, 400 may now be displayed on the device display 100 in step 503. This may be handled by the rendering engine 214, and since the display 120 may have a relatively low resolution, a resealing of the page 300, 400 may be necessary. The zoom level may be determined based on the resolution of the device display 120. By way of example, a device 100 may have a display 120 with a horizontal resolution of 480 pixels. In order to display a web page 300, 400 with a horizontal resolution of 800 pixels, it will be necessary to display the page 300, 400 at a zoom level of 30% in order to avoid horizontal scrolling. It may be desired to compromise by accepting some horizontal scrolling while achieving better readability of, e.g., headlines and make it easier to identify images. A zoom level of 60% will, e.g., result in a viewport with a horizontal resolution of 685 pixels on a display 120 with a horizontal resolution of 480 pixels.

The user may now view the document 300, 400, scroll horizontally or vertically and maybe move around the screen 120 with a pointing device. The user agent 200 may react to other instructions from the user, while, in step 504, waiting for an instruction to change zoom level.

When in step 505 the user agent 200 determines that an instruction to change the zoom level has been received, it will be necessary to determine on which area to zoom in. Various methods have been suggested to help the user make such a selection. The present invention is not limited to any one such method. The user agent 200 may simply zoom in on the upper left corner of the document when receiving a request to zoom in from the user. Other alternatives include a user interface that allows the user to move a rectangle representing the zoomed-in viewport around on the display 120. A zoom-in operation will zoom in on the area represented by the rectangle. Other alternatives include letting the user click or double-click somewhere on the screen 120, whereby the user agent 200 will zoom in on an area including the position clicked on by the user. The area may be selected such that the clicked-on position is in the center of the area, or more sophisticated methods may be used. One such method is described in U.S. patent application Ser. No. 11/525,177, which is hereby incorporated by reference in its entirety.

The zoom level to which the document 300, 400 is zoomed may be determined such that comfortable reading is possible, e.g., 150%. (A zoom level of 100% may be comfortable on a desktop monitor, but due to the smaller pixel size on devices additional zooming may be necessary.)

Consequently, it may be desirable to wrap text such that no text line is longer than 480 pixels on the display 120, which with a zoom level of 150% corresponds to 320 pixels. This rewrapping may be performed in step 506.

After the text has been rewrapped, the layout of the entire document 300, 400 must be created again. This may be performed in a step 507, in order to create a document layout such as that exemplified by FIG. 4B in a virtual display in memory 102. This virtual layout may then be used in order to again display the document 300, 400 on the display 120 of the device after returning to step 503. This time, of course, the displaying of the document 300, 400 is based on the zoomed-in viewport.

When the zoom level again is changed, i.e., when the user again zooms out (or in some embodiments, changes to another available zoom level), the text is again rewrapped in step 506, a new layout is created, and the document 300, 400 is again displayed in step 503.

The example described above and illustrated in FIG. 5 assumes that the user agent 200 only switches between two zoom levels and that the viewport always fills the entire width of the screen. The invention is not limited in this respect, and according to various embodiments consistent with the principles of the invention, the user may zoom to other zoom levels or change the width of the viewport such that it no longer fills the entire width of the display 120. A special case of the latter is when the user agent 200 allows the user to switch between a portrait view and a landscape view. By way of example, a display with dimensions 480×640 pixels may switch between a viewport that is 685 pixels wide (zoom out) and 320 pixels wide (zoom in) when in portrait mode, and 914 pixels wide and 426 pixels wide when in landscape mode. (The resolution of the display 120 is, of course, determined by the device hardware. When talking about the viewport, reference is made to number of pixels with respect to the original document 300, 400.) Text wrapping when zooming in would, on such a device 100, be enforced at 320 pixels in portrait mode and 426 pixels in landscape mode. This may be set as parameters in a configuration file, or may be determined by the user agent 200 based on information about the device 100 reported, e.g., from the rendering engine 213 or the window manager 203.

Figure 6:
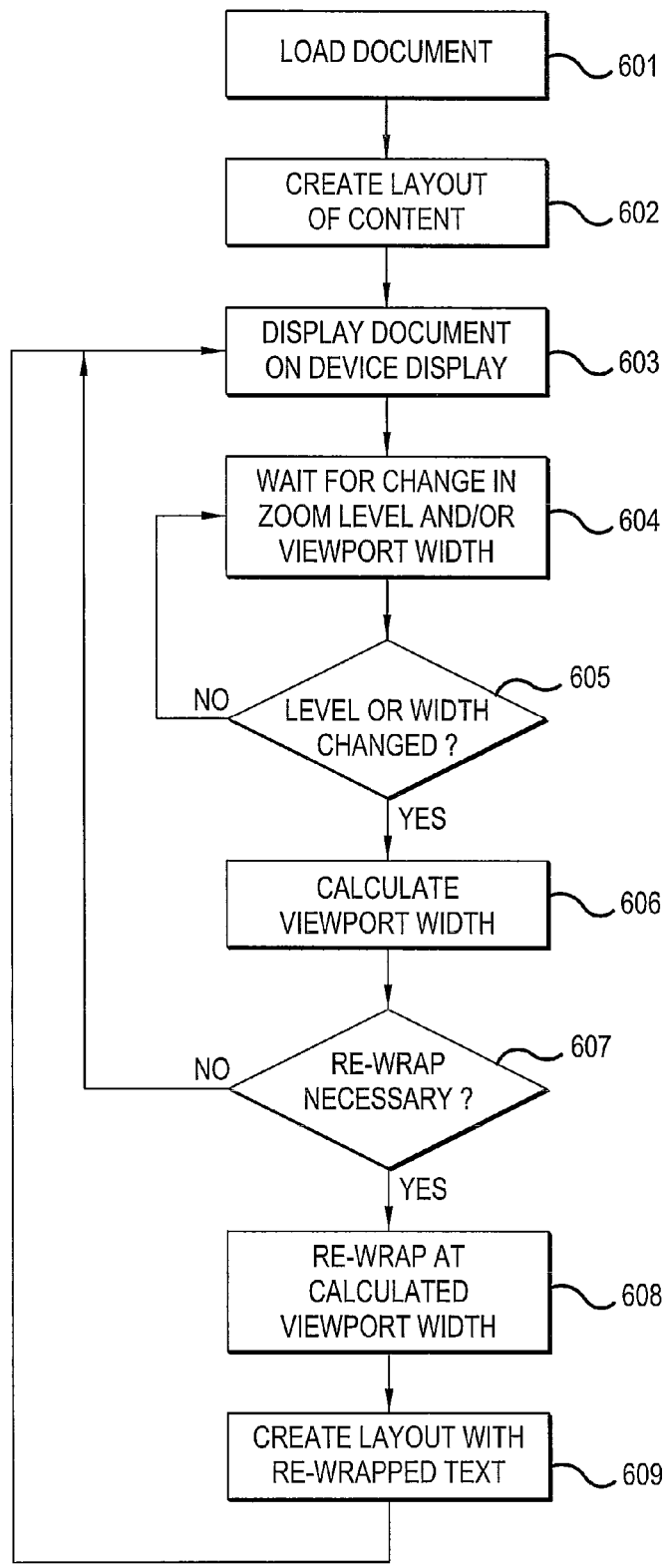
FIG. 6 is a flowchart illustrating a method of the invention.

Reference is now made to FIG. 6 which illustrates an embodiment of the invention which allows the user to change zoom level and the size of the viewport dynamically. Change of zoom level may typically be invoked through either a slider associated with a window or with the entire display 120, and the size of the viewport may be manipulated, e.g., by dragging and dropping the edge of a window using a pointing device.

In a first step 601, a document 300, 400 is loaded. The layout is then determined in a following step 602. In a next step 603, the document 300, 400 is displayed on a device display. The user agent 200 may then perform other functions while waiting in a waiting step 604 for instructions to change the zoom level or the viewport width. These steps may correspond to the steps 501, 502, 503, 504 performed according to the embodiment described with reference to FIG. 5.

Then in a next step 605, when it is determined that the zoom level or the viewport width has been changed, the process may move on to a next step 606 where the new viewport width is calculated. The zoom level may be determined from user input. The viewport width may be determined based on user input or information obtained from the rendering engine 213 or the window manager 203. First the viewport width in terms of hardware resolution is determined. Continuing with the example where a device 100 has a display 120 with a horizontal resolution of 480 pixels, the hardware based viewport is 480 pixels if the entire screen 120 is used, as in the example described above with reference to FIG. 5. However, if the user reduces the size of the window wherein the document 300, 400 is displayed, or if other content (such as, e.g., vertical scroll bars or navigation icons) take up a certain number of pixels in the horizontal direction, the viewport may be reduced to, e.g., 400 pixels in the horizontal direction.

Based on this hardware resolution of the viewport, the real size of the viewport, in terms of the resolution of the original document 300, 400, may be determined. If the zoom level is 150%, as described in the previous example, text wrapping may be enforced at 266 pixels. However, if the user decides to zoom in even further, e.g., to 180%, text wrapping will have to be enforced at 222 pixels in order to avoid horizontal scrolling.

It will now be realized that if the user continues to make the viewport narrower or to increase the zoom level, a point will be reached where it no longer makes any sense to rewrap the text at even shorter line lengths. Consequently, a lower limit for text rewrapping may be enforced. If the viewport is even narrower than this threshold, text may be rewrapped at the threshold pixel value, and horizontal scrolling may become necessary.

Similarly, rather than enforce rewrapping as soon as the user starts to zoom in, an upper threshold may be set, above which no text wrapping except that which is determined by the document author or normal CSS rules, is enforced. This may be done, e.g., because below a certain zoom level, the text can be assumed to be so tiny that it cannot comfortably be read, and it becomes more important to view the document 300, 400 with the layout that the author created in order to obtain an impression of the content of the document 300, 400 as a whole, even if horizontal scrolling becomes necessary also across text lines.

Step 607 may be determine whether text rewrapping is necessary, taking into consideration change in viewport width (as determined in step 606), and any maximum or minimum threshold for text rewrapping. If rewrapping is not necessary, the process may return to step 603 and display the document 300, 400 in accordance with the changes that have been made, but without enforcing any rewrapping of text.

If, on the other hand, it is determined in step 607 that rewrapping is necessary, the process moves on to step 608 where text is rewrapped at the calculated viewport width. This step may correspond to step 506. The layout of the page with rewrapped text is then created in step 609, which may correspond to step 507.

The process may then return to step 603 and display the content according to the new layout.

As already mentioned above, various methods may exist for selecting the area to zoom in on. However, it will readily be realized from FIG. 4A and FIG. 4B that the dimensions of the document 400 may change as a result of the rewrapping. Consequently, it may be desirable to keep track of where in the document 300, 400 the selected area was prior to the change in zoom level occurred, and display the document 300, 400 accordingly. By way of example, if a user was zooming in and out at a place located a certain number of pixels from the top of a document 300, 400, and the text rewrapping changed the length of the document 300, 400 considerably, the text that would be displayed after zooming in would not be the text selected before the zooming in operation was performed. The originally zoomed-in text would be some place closer to the top of the document 300, 400.

Consistent with the principles of the invention, according to some embodiments, the area which is zoomed into in the layout of the document 300, 400 after text rewrapping is chosen based on the position of an element that was selected by the user as part of the zooming in process, or that was selected by other criteria.

According to a first such embodiment, the user invokes the zooming-in function by double clicking somewhere on the screen 120 of the device 100 (or otherwise selects a position with a pointing device). The position must, by necessity be inside at least one box, which is the containing block of the entire document. Furthermore, the position may be inside the box of, e.g., an article containing several text elements, or a single paragraph. The position may also identify an image, a table cell, or any other type of element.

The area of the document 300, 400 zoomed into, after a new layout has been created following rewrapping of the text, may be chosen such that if the position selected by the user was inside several boxes, the box furthest down the DOM tree is selected (e.g., a paragraph of text is chosen rather than a table cell containing the text, and a table cell is chosen rather than the entire table). However, additional rules may override this such that, e.g., some types of element are preferred over others (e.g., text is preferred over images), or be used instead.

The region zoomed into, may then be chosen such that the identified element is positioned in the upper left corner of the viewport. (Other alternatives, such as in the center of the viewport, are of course consistent with the principles of the invention.)

According to a second such embodiment, the user selects an area rather than a position, either by defining a rectangle by dragging a pointing device, or by using the pointing device to position a rectangle representing the viewport after zooming in. The element selected may then be any element inside the selected area, chosen according to any of a number of criteria, including position in the DOM structure of the document 300, 400, element type, position in side the rectangle before zooming in (e.g., the element closest to the upper left corner, the element closest to the left edge of the rectangle, or the element closest to the center of the document 300, 400.

Consistent with the principles of the invention, it is possible to select not only the element on which to zoom in, but a position in that element. Information regarding a particular word or a character in a text, or the coordinate of a point in an image may be obtained from the input manager 203, and this information can be used when determining the region to zoom in to.

Additional information regarding selection of elements based on the CSS box model can be found in the above referenced U.S. patent application Ser. No. 11/525,177, which is incorporated herein by reference.

Yet another alternative, which may, e.g., be used if no position is selected, and zoom level is chosen simply by using a slider, choosing a zoom level in terms of a value (e.g., percentage), or toggling between zoom out and zoom in, is to maintain the position of the left edge of the viewport, and select an element close to the upper edge of the viewport to be aligned with the upper edge of the viewport after zooming in.

The same problem must be solved when zooming out, or indeed when changing between any two zoom levels or viewport widths resulting in a rewrapping of the text. When zooming in, the area can be chosen according to one of the methods described above. Zooming out does not have to be substantially different. If zooming out is invoked by double clicking or otherwise identifying an element, the area displayed in response to a zoom-out operation may be selected such that the selected element gets a predefined position in the zoomed-out viewport, e.g., the upper left corner. If zooming out is only a question of selecting a different zoom level, the area may be selected such that an element inside the zoomed-in viewport is selected according to some predefined rule, and the zoomed out viewport is positioned such that the selected element receives a particular position in the viewport of the zoomed out and re-wrapped document, e.g., the upper left corner or the center of the viewport.

Again, another alternative is to maintain the position of the left edge of the viewport, and select an element close to the upper edge of the viewport to be aligned with the upper edge of the viewport after zooming out.

It would of course also be possible to return to the viewport position that was active before zooming in. However, this may be undesirable because the user may scroll to a very different position in the document 300, 400 while in the zoomed in view, and returning to a zoomed-out view consistent with the position prior to all of the scrolling in the document 300, 400 may not be considered very user friendly.

A very simple method of zooming out is, of course, to retain the center of the zoomed-in viewport as the center of the new zoomed out viewport, or treating another position in the zoomed-in viewport in the same way (e.g., the upper left corner).

Returning now to FIG. 4, boxes 410 and 411 illustrates how the viewport position may be selected in a zoomed-out and zoomed-in view. In FIG. 4A, the document 400 is shown with its original layout, as defined by the document author. A box 410 illustrates the viewport of a device in zoomed-out mode. FIG. 4B illustrates the same document after rewrapping of the text 405, 407. A box 411 illustrates a position of the viewport after zooming in. The zooming-in operation may, e.g., have been invoked by a user double clicking on the text 407. This may have selected the box of the associated containing element, which may then be positioned in the upper left corner of the zoomed in viewport, as illustrated by the box 411.

The reverse operation may result in a zoom-out area with the text 407 in the upper left corner. However, according to this example, the document 400 is no wider than the viewport of the display in the zoomed-out mode. Consequently, positioning the box containing text 407 in the corner would actually mean positioning the left margin 401 outside the viewport and filling the right side and the bottom of the viewport with whitespace. This may not be very useful. Accordingly, in this case, the viewport may be positioned as illustrated by box 412, with the text 407 positioned as high up in the viewport as possible, while the entire width of the document 400 is shown. If the document 400 was wider than the viewport even in the zoomed-out mode, the viewport could have been positioned such that the text 407 started at the left edge of the viewport.

While the examples described above has all assumed that all text in the document 300, 400 should be rewrapped each time rewrapping is enforced, it is consistent with the principles of the invention to only rewrap some of the text in the document 300, 400 when a change of zoom level is enforced. According to some embodiments, only text that is inside the viewport is rewrapped. According to other embodiments, only text that is inside containing blocks with boxes which are at least partly inside the viewport is rewrapped. Other alternatives may also be contemplated.

It will be understood by those with skill in the art that the invention is not limited to the examples described above. For instance, without a pointer type input device, selection of elements may be more complicated, but a number of alternatives can be implemented, such as keyboard or joystick input that moves from element to element.

It should be understood that the exact nature of the user input device and the data received from the input device is not an essential part of the invention, as long as it can be translated to or associated with a position, a region or an element somewhere in the page 300, 400.

When user input that is representative of a position within the layout of the page 300, 400 is received and identified as a user attempt at invoking a zoom-in or a zoom-out operation, the received position may be used to select a region of interest. User input may in many embodiments consistent with the invention be received for other purposes than invoking a zooming operation, such as clicking on a hyperlink or bringing focus to a particular element such as an input field. Various methods may be used in order to identify the user input as an attempt to perform a zooming operation. According to some embodiments, user input representing a position of a pointing device and a mouse click may be identified as such input, provided that the position of the pointing device is not associated with an active element such as, e.g., a hyperlink, a button, an input field, or a drop down menu. Alternative embodiments include a pointing device position and a click from a second mouse button or a click combined with the pressing of a keyboard key (e.g., shift+click), clicking and dragging the pointing device, pressing a tabulator key repeatedly until a proper element is chosen followed by the pressing of a designated keyboard key, or any other user input specified by a designer and capable of identifying a position such as a point, an element or a region.

The various parameters used to determine the maximum line length at which to wrap lines may be part of the native code of the user agent 200, or they may be stored in configuration files, or a combination of both. Such configuration files may then be prepared for installation on different devices 100, such that one configuration file can be made available for some devices 100, a different configuration file can be made available for other devices 100, etc., depending on hardware capabilities (e.g., display resolution) of each such device. For some devices 100, the parameters may be derived from information about the display 120 received from the rendering engine and the input manager of the user agent 200 (e.g., browser).

Finally, it will be understood by those with skill in the art that the invention may be implemented on a number of hardware/software combinations, and that it is not dependent on any particular hardware or software platform, operating system, programming language, communications protocol, markup language, and layout definition and rendering specification.

The invention claimed is:

1. A method of performing dynamic text wrapping when displaying a selected region of an electronic document on a display screen of a device, comprising:
    loading into a memory device, a document comprising text and at least one non-textual element;
    determining by the processor, a first layout of said document including the text and the at least one non-textual element, such that relative positions of boxes containing the text and the at least one non-textual element in said first layout are specified in the code of the document;
    displaying on the display screen, at least a part of said document at a first resolution ratio and in accordance with the determined layout, wherein the text in the document is wrapped in accordance with the first layout;
    receiving user input representing a command to display said document at a second resolution ratio;
    rewrapping by the processor, at least some of the text in said document based on a maximum line length associated with said second resolution ratio;
    determining by the processor, a second layout of said document including the text and the at least one non-textual element after the at least some of the text is rewrapped by modifying a width of the block containing the rewrapped text to correspond to the maximum line length, without otherwise modifying the relative positions of the boxes specified in the code; and
    displaying on the display screen, at least a part of said document including the rewrapped text at said second resolution ratio in accordance with the second layout,
    wherein said user input representing a command to display said document at a second resolution ratio includes information that identifies an element in said document, and the step of displaying said document at said second resolution ratio includes the step of positioning said identified element at a predefined position in said display screen.

2. The method according to claim 1, wherein said maximum line length is defined by the width of the display screen of said device.

3. The method according to claim 1, wherein said maximum line length is defined in a configuration file.

4. The method according to claim 1, wherein said maximum line length is defined by the width of a window within which said document is displayed.

5. The method according to claim 1, wherein said second resolution ratio is defined as a ratio of hardware display pixels to original document pixels along one dimension, and said maximum line length in terms of original document resolution ratio is determined as the width of a display window in hardware pixels divided by said ratio of hardware display pixels to original document pixels along one dimension.

6. The method according to claim 1, wherein the user input comprises at least one of: a command to zoom in on a selected location in the displayed document, and a command to resize a window containing the displayed document, the rewrapping of text being performed in response to the user input.

7. A computing device configured to display electronic documents for selecting and displaying a region of interest in an electronic document, comprising:
   a display screen;
   a user input interface;
   a communication interface configured to receive electronic documents;
   memory into which a received document can be loaded;
   a processing unit configured to:
      load a document comprising text and at least one non-textual element;
      determine a first layout of said document including the text and the at least one non-textual element, such that relative positions of boxes containing the text and the at least one non-textual element in said first layout are specified in the code of the document, wherein the text in the document is wrapped in accordance with the first layout;
      display at least a part of said document on the display screen at a first resolution ratio and in accordance with the first layout;
      receive user input representing a command to display said document at a second resolution ratio;
      rewrap at least some of the text in said document based on a maximum line length associated with said second resolution ratio;
      determine a second layout of said document including the text and the non-textual element after the at least some of the text has been rewrapped by modifying a width of the block containing the rewrapped text to correspond to the maximum line length, without otherwise modifying the relative positions of the boxes specified in the code; and
      display on the display screen at least a part of said document including the rewrapped text at said second resolution ratio in accordance with the second layout,
   wherein said user input representing a command to display said document at a second resolution ratio includes information that identifies an element in said document, and that the step of displaying said document at said second resolution ratio includes the step of positioning said identified element at a predefined position in said display screen.

8. The computing device according to claim 7, wherein said maximum line length is defined by the width of the display screen of said device.

9. The computing device according to claim 7, wherein said maximum line length is defined in a configuration file.

10. The computing device according to claim 7, wherein said maximum line length is defined by the width of a window within which said document is displayed.

11. The computing device according to claim 7, wherein said second resolution ratio is defined as a ratio of hardware display pixels to original document pixels along one dimension, and said maximum line length in terms of original document resolution ratio is determined as the width of a display window in hardware pixels divided by said ratio of hardware display pixels to original document pixels along one dimension.

12. The computing device according to claim 7, wherein the user input comprises at least one of a command to zoom in on a selected location in the displayed document, and a command to resize a window containing the displayed document, the rewrapping of text being performed in response to the user input.

13. A non-transitory computer readable storage medium on which is embodied a computer program comprising instructions that, when executed on a computer, performs the following steps:
   loading a document comprising text and at least one non-textual element into a memory device;
   determining a first layout of said document including the text and the at least one non-textual element, such that relative positions of boxes containing the text and the at least one non-textual element in said first layout are specified in the code of the document;
   displaying at least a part of said document at a first resolution ratio and in accordance with the first layout on a display device;
   receiving user input representing a command to display said document at a second resolution ratio;
   rewrapping at least some of the text in said document based on a maximum line length associated with said second resolution ratio;
   determining a second layout of said document including the text and the at least one non-textual element after the at least some of the text has been rewrapped by modifying a width of the block containing the rewrapped text to correspond to the maximum line length, without otherwise modifying the relative positions of the boxes specified in the code; and
   displaying on the display device at least a part of said document including the rewrapped text at said second resolution ratio in accordance with the second layout,
wherein said user input representing a command to display said document at a second resolution ratio includes information that identifies an element in said document, and that the step of displaying said document at said second resolution ratio includes the step of positioning said identified element at a predefined position in said display device.

14. The computer readable storage medium according to claim 13, wherein said maximum line length is defined by the width of the display device.

15. The computer readable storage medium according to claim 13, wherein said maximum line length is defined in a configuration file.

16. The computer readable storage medium according to claim 13, wherein said maximum line length is defined by the width of a window within which said document is displayed.

17. The computer readable storage medium according to claim 13, wherein said second resolution ratio is defined as a ratio of hardware display pixels to original document pixels along one dimension, and said maximum line length in terms of original document resolution ratio is determined as the width of a display window in hardware pixels divided by said ratio of hardware display pixels to original document pixels along one dimension.

18. The computer readable storage medium of claim 13, wherein the user input comprises at least one of: a command to zoom in on a selected location in the displayed document, and a command to resize a window containing the displayed document, the rewrapping of text being performed in response to the user input.

* * * * *